US012565385B2

(12) United States Patent
Lee

(10) Patent No.: US 12,565,385 B2
(45) Date of Patent: Mar. 3, 2026

(54) ARTICLE LOADING APPARATUS AND ARTICLE LOADING METHOD

(71) Applicants: HYUNDAI MOTOR COMPANY, Seoul (KR); KIA CORPORATION, Seoul (KR)

(72) Inventor: Dong Wook Lee, Ulsan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 597 days.

(21) Appl. No.: 17/973,908

(22) Filed: Oct. 26, 2022

(65) Prior Publication Data

US 2024/0025668 A1     Jan. 25, 2024

(30) Foreign Application Priority Data

Jul. 20, 2022     (KR) ........................ 10-2022-0089620

(51) Int. Cl.
B65G 47/90          (2006.01)
B23P 19/00          (2006.01)
(Continued)

(52) U.S. Cl.
CPC ............. B65G 47/90 (2013.01); B65G 65/00 (2013.01); B23P 19/002 (2013.01); B25J 11/0005 (2013.01); B25J 15/0253 (2013.01); B25J 15/0608 (2013.01); B25J 19/023 (2013.01); B62D 65/02 (2013.01); B62D 65/022 (2013.01); B62D 65/024 (2013.01); B65G 47/92 (2013.01);
(Continued)

(58) Field of Classification Search
CPC .... B62D 65/02; B62D 65/022; B62D 65/024; B65G 47/90; B65G 47/92; B65G 65/00; B65G 2203/0233; B65G 2203/041; B23P 19/002; B25J 11/0005; B25J 15/0253; B25J 15/0608; B25J 19/023
See application file for complete search history.

(56) References Cited

U.S. PATENT DOCUMENTS

2021/0354256 A1     11/2021  Negre
2022/0111987 A1*     4/2022  Solanki ............... B25J 15/0253
(Continued)

FOREIGN PATENT DOCUMENTS

CN          108581469 A     9/2018
JP          2001-293623 A     10/2001
(Continued)

*Primary Examiner* — Jay Khandpur
(74) *Attorney, Agent, or Firm* — McDonnell Boehnen Hulbert & Berghoff LLP

(57)          ABSTRACT

An article loading method includes a first transfer step of picking up at least some of a plurality of articles accommodated in a storage member and transferring the articles to an upper portion of a plate, a dropping step of dropping the plurality of articles, which is transferred to the upper portion of the plate in the first transfer step, onto the plate, a second transfer step of picking up some of the articles, which are dropped onto the plate in the dropping step, and transferring the articles to an alignment unit, and a loading step of transferring the article, which is transferred to the alignment unit in the second transfer step, and loading the article to one side, in which the article is freely dropped toward the plate in the dropping step.

13 Claims, 7 Drawing Sheets

(51) Int. Cl.

| | | |
|---|---|---|
| *B25J 11/00* | (2006.01) | |
| *B25J 15/02* | (2006.01) | |
| *B25J 15/06* | (2006.01) | |
| *B25J 19/02* | (2006.01) | |
| *B62D 65/02* | (2006.01) | |
| *B65G 47/92* | (2006.01) | |
| *B65G 65/00* | (2006.01) | |

(52) U.S. Cl.
        CPC ................ *B65G 2203/0233* (2013.01); *B65G 2203/041* (2013.01)

(56)                    References Cited

U.S. PATENT DOCUMENTS

| | | | | |
|---|---|---|---|---|
| 2022/0143834 A1* | 5/2022 | Uto | ................... | H05K 13/0408 |
| 2023/0034430 A1* | 2/2023 | Chen | ................... | B65G 1/1375 |
| 2023/0348192 A1* | 11/2023 | Forster | .................. | B65G 57/24 |
| 2023/0415345 A1* | 12/2023 | Zizka | ...................... | B25J 5/007 |
| 2024/0217602 A1* | 7/2024 | Shah | ................... | B62D 65/024 |

FOREIGN PATENT DOCUMENTS

| | | | |
|---|---|---|---|
| JP | 2009-143716 A | 7/2009 | |
| KR | 10-0610784 B1 | 8/2006 | |
| KR | 10-1495612 B1 | 2/2015 | |
| KR | 10-1496902 B1 | 3/2015 | |
| KR | 2020-0035961 A | 4/2020 | |

* cited by examiner

700

400

410

ARTICLE LOADING APPARATUS AND ARTICLE LOADING METHOD

CROSS REFERENCE TO RELATED APPLICATIONS

This application claims priority to and the benefit of Korean Patent Application No. 10-2022-0089620 filed in the Korean Intellectual Property Office on Jul. 20, 2022, the entire contents of which are incorporated herein by reference.

TECHNICAL FIELD

The present disclosure relates to an article loading apparatus and an article loading method, and more particularly, to an article loading apparatus and an article loading method, which are capable of effectively transferring a plurality of articles loaded irregularly.

BACKGROUND

A process of loading components onto a large-scale structure such as a carrier is required during a process of manufacturing a vehicle body of a vehicle and the like. A subsequent process such as welding is performed after the components are loaded onto the large-scale structure. Meanwhile, because the components to be loaded onto the carrier or the like are small in size, there has been widely used a method of loading the components into a storage box, unloading the components required to be loaded, and then loading the components onto the carrier.

However, in the related art, the components to be loaded are small in size and have complicated geometric shapes, which makes it difficult to automate the process of unloading and loading the components. Furthermore, because the component is unloaded from the storage box in a state in which the components are randomly loaded into the storage box, the components overlap or interfere with each other in the storage box. For this reason, there is a problem in that it is difficult to unload the component through the automation process. For this reason, in the related art, there is a problem in that it is difficult to automate the process of loading the components.

SUMMARY

The present disclosure has been made in an effort to automate a process of loading a component.

An embodiment of the present disclosure provides an article loading apparatus including a storage member configured to accommodate a plurality of articles, a plate provided at one side of the storage member, and a first holding unit provided at one side of the storage member and one side of the plate and configured to pick up the article provided in the storage member and the article provided in the plate, in which the first holding unit includes an electromagnet member configured to pick up the plurality of articles accommodated in the storage member and transfer the plurality of articles, and a pinching member configured to hold the article provided in the plate and transfer the article.

The plate may be provided above the storage member and disposed adjacent to one side based on a horizontal direction from the storage member.

The article loading apparatus may further include an alignment unit provided at one side of the first holding unit and configured to receive the article held by the pinching member, in which the alignment unit includes a guard member having an accommodation space configured to accommodate the article, in which the guard member includes a plurality of blocks configured to define the accommodation space and surround a lateral surface of the article, and in which some of the plurality of blocks are movable relative to another block.

The guard member may be provided in plural, and the plurality of guard members may be provided in the alignment unit.

The article loading apparatus may further include a magnetic member provided at one side of the first holding unit, in which the magnetic member is provided within a distance in which the pinching member is capable of reaching the magnetic member.

The article loading apparatus may further include a second holding unit provided at one side of the alignment unit and configured to hold the article accommodated in the guard member and load the article to one side.

The article loading apparatus may further include a support unit to which the storage member and the plate are coupled, in which the plate is rotatably coupled to the support unit so as to be inclined toward the storage member, and in which the support unit includes: stopper members provided to face two opposite surfaces of the storage member; and a guard member provided to face one side surface of the storage member and configured to be rotatable about a rotary shaft extending in an upward/downward direction.

Another embodiment of the present disclosure provides an article loading method including a first transfer step of picking up at least some of a plurality of articles accommodated in a storage member and transferring the articles to an upper portion of a plate, a dropping step of dropping the plurality of articles, which is transferred to the upper portion of the plate in the first transfer step, onto the plate, a second transfer step of picking up some of the articles, which are dropped onto the plate in the dropping step, and transferring the articles to an alignment unit, and a loading step of transferring the article, which is transferred to the alignment unit in the second transfer step, and loading the article to one side, in which the article is freely dropped toward the plate in the dropping step.

A plurality of articles may be transferred to the upper portion of the plate in the first transfer step, and the articles may be transferred one by one from the plate to the alignment unit in the second transfer step.

The first transfer step may include a step of picking up at least some of the plurality of articles accommodated in the storage member by using a magnetic force of an electromagnet member and transferring the articles to the upper portion of the plate.

The second transfer step may include a step of holding, by a pinching member, some of the articles accommodated in the plate and transferring the articles to the alignment unit.

The article loading method may further include a storage member vision capturing step of, before the first transfer step, capturing images of position states of the plurality of articles in the storage member, in which the first transfer step is performed when it is determined, in the storage member vision capturing step, that the article exists in the storage member.

The article loading method may further include a plate vision capturing step of, before the second transfer step, capturing an image of a position state of the article in the plate, in which the second transfer step is performed when it is determined, in the plate vision capturing step, that at least some of the articles disposed in the plate are capable of being held.

When at least some of the articles disposed in the plate and captured in the plate vision capturing step are disposed in a first state, the pinching member may hold the article disposed in the first state in the plate and transfer the article to the alignment unit in the second transfer step, and the article held by the pinching member in the second transfer step may be kept continuously held by the pinching member until the article reaches the alignment unit.

When at least some of the articles disposed in the plate and captured in the plate vision capturing step are disposed in a second state different from the first state, in the second transfer step, the pinching member may hold the article disposed in the second state in the plate, the pinching member may attach the article to a magnetic member having magnetism and separate from the article, the pinching member may hold again the article attached to the magnetic member, and then the pinching member may transfer the article to the alignment unit.

In the second transfer step, a portion of the article which is disposed in the second state in the plate and with which the pinching member comes into contact to hold the article may be different from a portion of the article which is attached to the magnetic member and brought into contact with the pinching member.

In the second transfer step, the pinching member may hold the article disposed in the second state in the plate when there exists no article disposed in the first state in the plate.

The article loading method may further include a returning step of returning the article in the plate to the storage member when it is determined that the article, which is capable of being held by the pinching member, does not exist in the plate captured in the plate vision capturing step.

In the returning step, the plate spaced apart upward from the storage member may be inclined toward the storage member, such that the article in the plate is dropped onto the storage member.

According to the present disclosure, it is possible to automate the process of loading a component.

DETAILED DESCRIPTION

Hereinafter, an article loading apparatus and an article loading method according to the present disclosure will be described with reference to the drawings.

Figure 1:
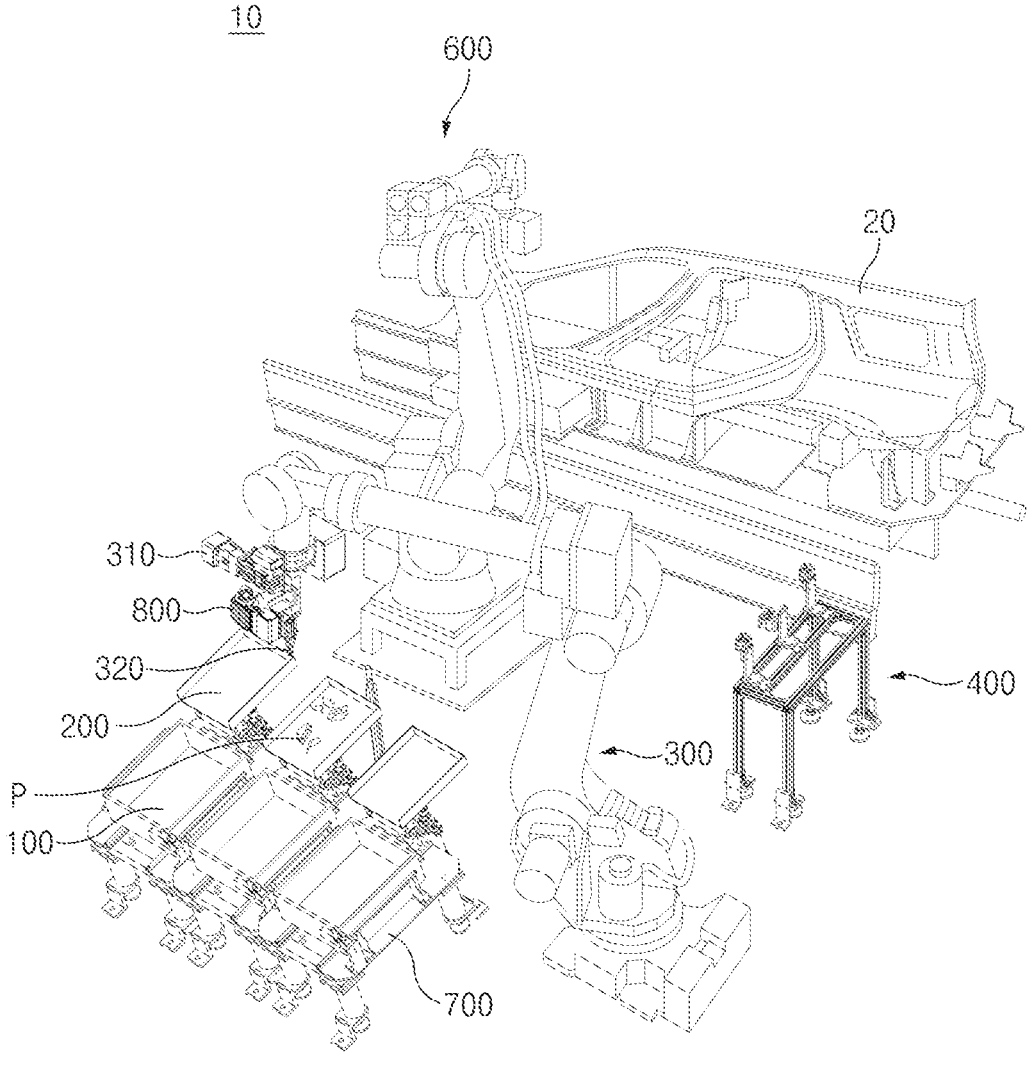
FIG. 1 is a perspective view illustrating an article loading apparatus according to the present disclosure.
Figure 2:
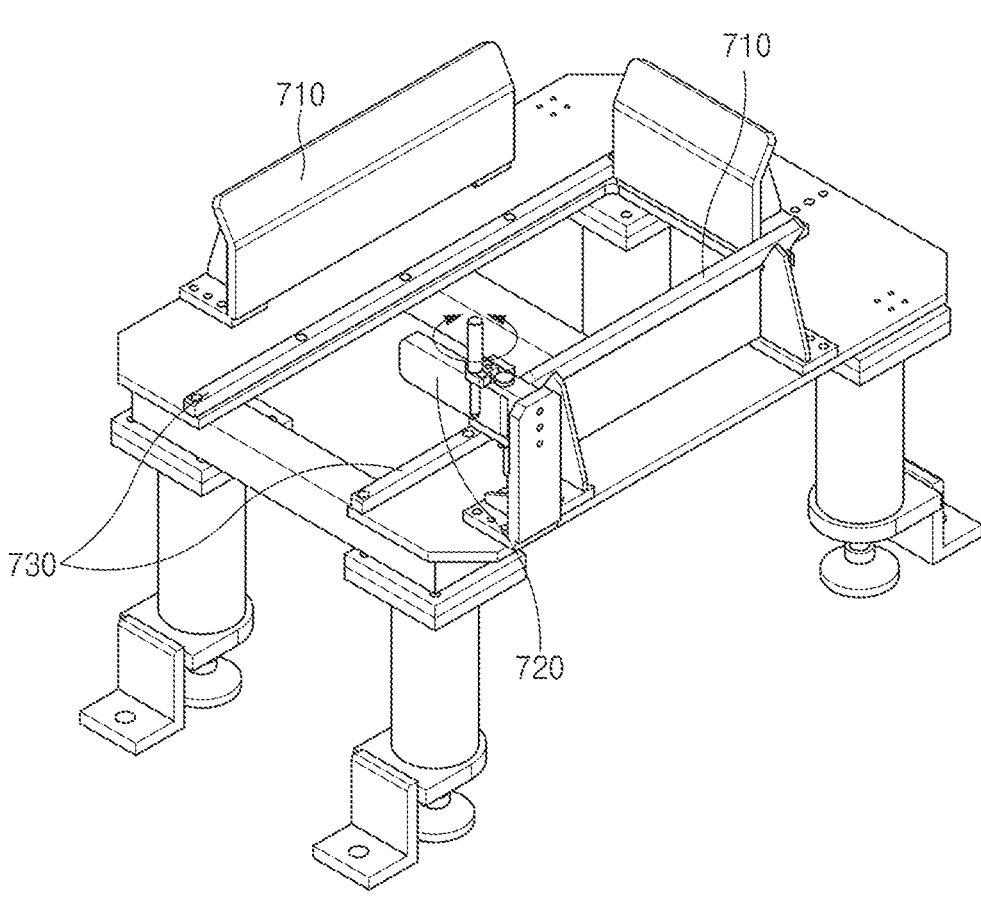
FIG. 2 is a perspective view illustrating a storage member, a plate, and a support unit provided in the article loading apparatus according to the present disclosure.
Figure 3:
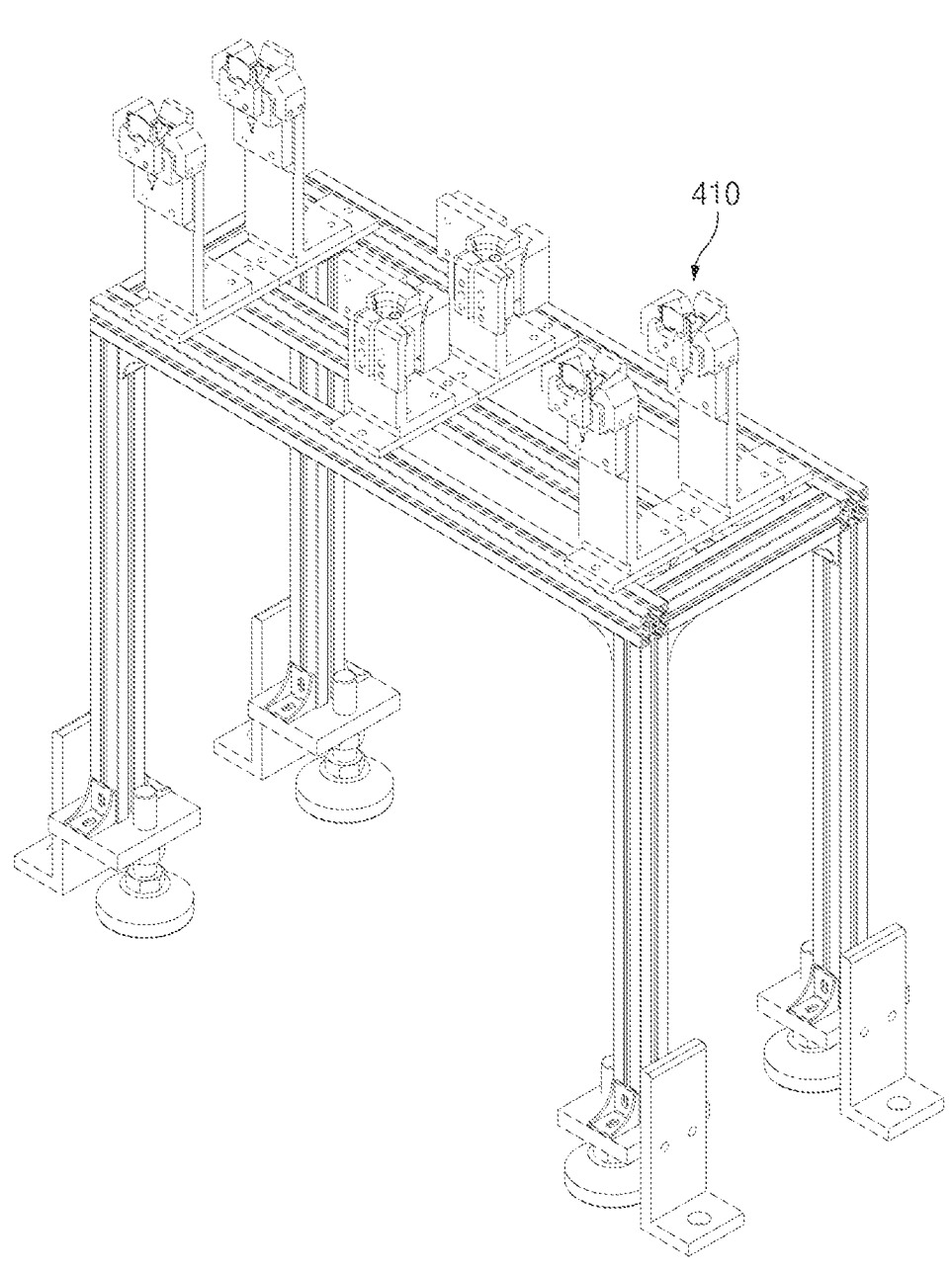
FIG. 3 is a perspective view illustrating an alignment unit provided in the article loading apparatus according to the present disclosure.
Figure 4:
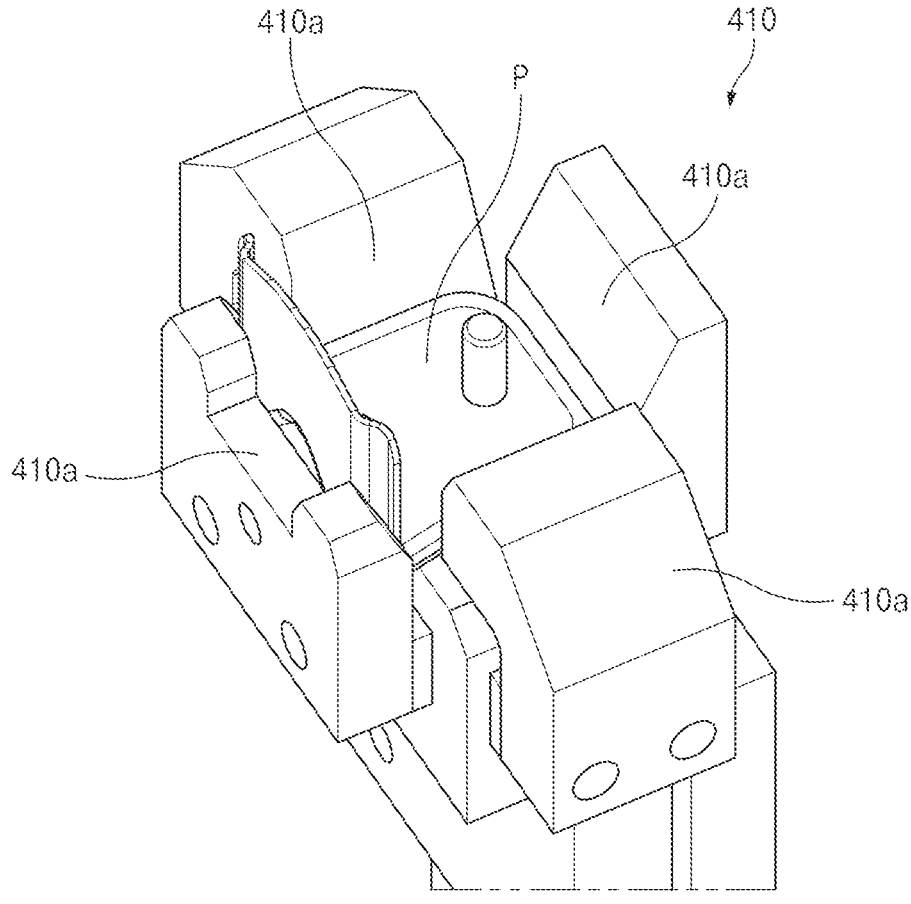
FIG. 4 is an enlarged view of a guard member of the alignment unit according to the present disclosure.
Figure 5:
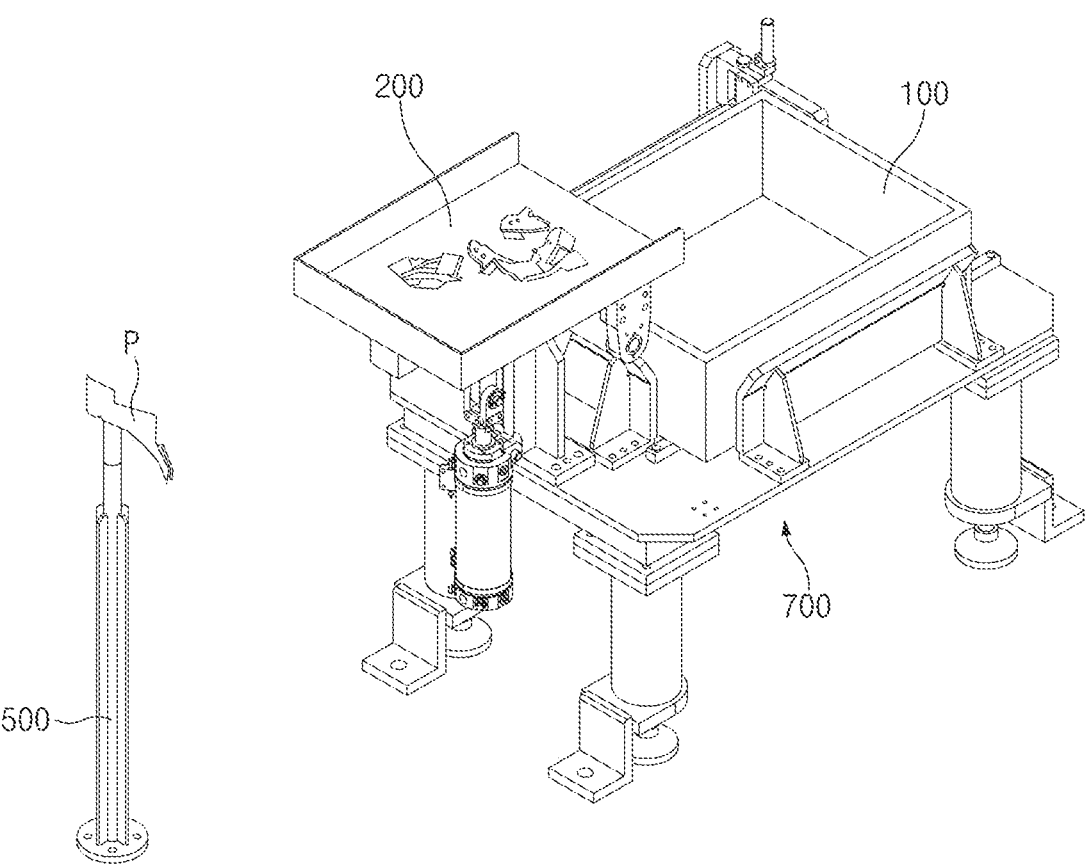
FIG. 5 is a view illustrating a first example in which a magnetic member is provided in the article loading apparatus according to the present disclosure.
Figure 6:
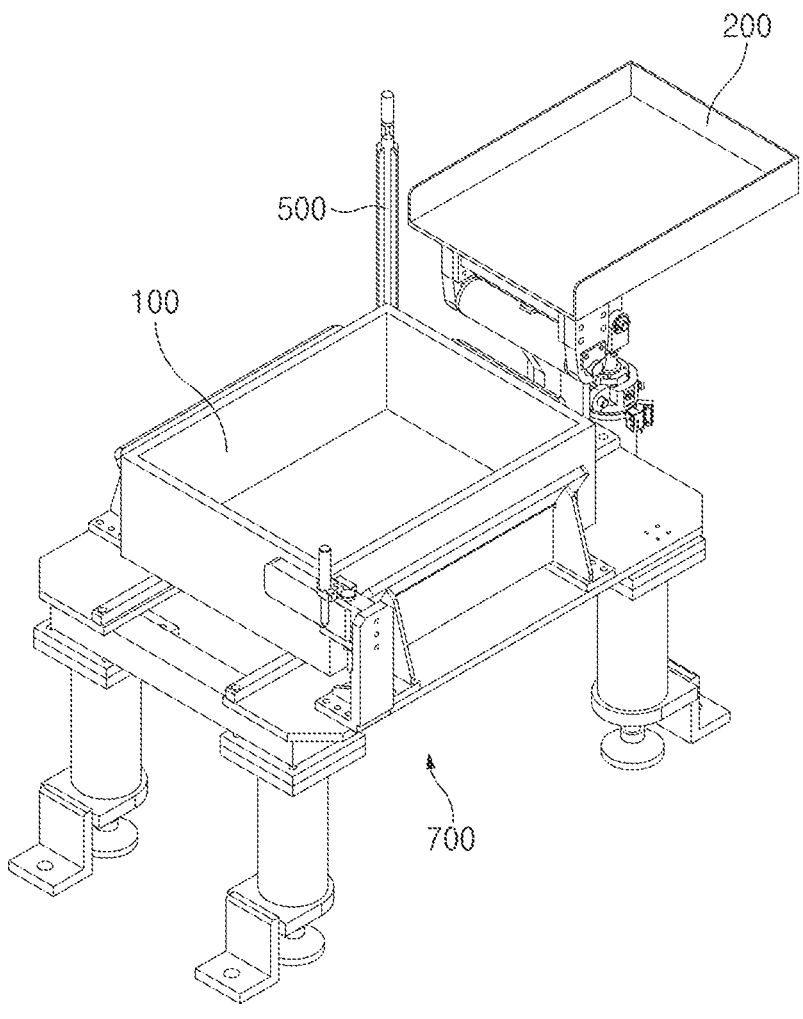
FIG. 6 is a view illustrating a second example in which the magnetic member is provided in the article loading apparatus according to the present disclosure.

FIG. 1 is a perspective view illustrating an article loading apparatus according to the present disclosure, and FIG. 2 is a perspective view illustrating a storage member, a plate, and a support unit provided in the article loading apparatus according to the present disclosure. FIG. 3 is a perspective view illustrating an alignment unit provided in the article loading apparatus according to the present disclosure, and FIG. 4 is an enlarged view of a guard member of the alignment unit according to the present disclosure. FIG. 5 is a view illustrating a first example in which a magnetic member is provided in the article loading apparatus according to the present disclosure, and FIG. 6 is a view illustrating a second example in which the magnetic member is provided in the article loading apparatus according to the present disclosure. FIGS. 7A-7D are views sequentially illustrating a state in which a posture of the magnetic member is changed before an article is loaded onto a carrier by the article loading apparatus according to the present disclosure.

An article loading apparatus 10 according to the present disclosure may refer to an apparatus for loading an article required to be assembled during a process of manufacturing a product. For example, referring to FIG. 1, the article loading apparatus 10 may refer to an apparatus for loading a component, which is required to be assembled, onto a carrier 20. However, the article loading apparatus 10 according to the present disclosure may be used for various types of loading processes without being limited to the above-mentioned contents.

Referring to FIG. 1 and the like, the article loading apparatus 10 according to the present disclosure may include storage members 100 configured to accommodate a plurality of articles P, and plates 200 provided at one side of the storage members 100. As described below, at least some of the plurality of articles P accommodated in the storage member 100 may be transferred to the plate 200. Meanwhile, a bottom surface of the plate 200 may have a flat shape to stably support the article P.

The article loading apparatus 10 may further include a first holding unit 300 disposed at one side of the storage members 100 and one side of the plate 200 and configured to pick up the article P provided in the storage member 100 and the article P provided in the plate 200. More specifically, the first holding unit 300 may serve to transfer the article P provided in the storage member 100 to the plate 200 and to transfer the article P provided in the plate 200 to an alignment unit 400 to be described below.

The first holding unit 300 may include a component for picking up the article P provided in the storage member 100, and a component for picking up the article P provided in the plate 200. More specifically, the first holding unit 300 may include an electromagnet member 310 configured to pick up the plurality of articles P accommodated in the storage member 100 and transfer the plurality of articles P, and a pinching member 320 configured to hold the article provided in the plate 200 and transfer the article. Therefore, according to the present disclosure, the article P may be attached by a magnetic force of the electromagnet member 310 and transferred from the storage member 100 to the plate 200. Therefore, the plurality of articles may be attached to the electromagnet member 310 and transferred. In contrast, the pinching member 320 may hold the article P and transfer the article P from the plate 200 to the alignment unit to be described below. Therefore, the articles P may be transferred one by one. For example, the first holding unit 300 may further include a rotary member configured to be rotatable about a rotary shaft. The electromagnet member 310 and the pinching member 320 may be fixedly coupled to the rotary member. In this case, a position of the electromagnet member 310 and a position of the pinching member 320 may be changed by the rotational motion of the rotary member. Therefore, when the first holding unit 300 intends to pick up the article provided in the storage member 100, the first holding unit 300 may rotate the rotary member so that the electromagnet member 310 faces the storage member 100. When the first holding unit 300 intends to pick up the article provided in the plate 200, the first holding unit 300 may rotate the rotary member so that the pinching member 320 faces the plate 200.

Meanwhile, for example, as illustrated in FIG. 1 and the like, the plate 200 may be provided above the storage member 100 and disposed adjacent to one side from the storage member 100 based on a horizontal direction. More particularly, the plate 200 may be rotatable so as to be inclined toward the storage member 100.

As described below, according to an article loading method according to the present disclosure, when the article having a posture capable of being held by the pinching member 320 does not exist in the plate 200 any further, the article provided in the plate 200 may be returned to the storage member 100. To this end, according to the present disclosure, because the plate 200 is rotatable to be inclined toward the storage member 100, a process of returning the article P provided in the plate 200 to the storage member 100 may be automated.

Referring to FIGS. 1 and 2, the article loading apparatus 10 may further include a support unit 700 to which the storage member 100 and the plate 200 are coupled. In this case, the plate 200 may be rotatably coupled to the support unit 700 so as to be inclined toward the storage member 100. In addition, the storage member 100 may move away from the support unit 700. In this case, when the storage member 100 becomes empty as all the articles provided in the storage member 100 are transferred by the first holding unit 300, an empty storage member may be replaced with the storage member 100 having the plurality of articles P.

In addition, the support unit 700 may include stopper members 710 provided to face two opposite surfaces of the storage member 100. The stopper member 710 may be configured to prevent the storage member 100 from separating from the support unit 700. In addition, the support unit 700 may further include a guard member 720 provided to face one side surface of the storage member 100 and configured to be rotatable about a rotary shaft extending in a vertical (upward/downward) direction. Therefore, when an empty storage member is intended to be replaced with a new storage member, the guard member 720 may rotate so that the storage member 100 may move away from the support unit 700. In a state in which the article loading apparatus 10 operates, the guard member 720 may rotate to fix the storage member 100 so that the storage member 100 does not separate from the support unit 700. Meanwhile, for example, the support unit 700 may further include rail members 730 provided in a region in which the storage member 100 is seated. The rail members 730 may guide the storage member 100 so that the storage member 100 may move in a direction toward the guard member 720 or move in a direction away from the guard member 720. The rail members 730 may make it easier to replace the storage members 100.

Meanwhile, referring to FIGS. 1, 3, and 4, the article loading apparatus 10 may further include the alignment unit 400 which is provided at one side of the first holding unit 300 and to which the article held by the pinching member 320 is transferred.

The alignment unit 400 may be configured to maintain a predetermined aligned state of the article P before the article P is loaded onto the carrier 20 or the like. To this end, the alignment unit may include guard members 410 each having an accommodation space that accommodates the article P. That is, a predetermined aligned state of the article P may be maintained as the article P is positioned in the accommodation space formed in the guard member 410. Therefore, an inner surface of the guard member 410, which defines the accommodation space, may have a shape corresponding to an inner surface of the article P accommodated in the accommodation space. The article P held by the pinching member 320 may be dropped into the accommodation space defined by the inner surface of the guard member 410. Therefore, the article P dropped into the accommodation space of the guard member 410 may have a predetermined aligned state corresponding to the shape of the accommodation space.

For example, the guard member 410 may include a plurality of blocks 410a configured to define the above-mentioned accommodation space and provided to surround a lateral surface of the article P. In this case, some of the plurality of blocks 410a may be moved relative to another block 410a. In this case, the size and shape of the accommodation space defined by the inner surface of the guard member 410 may be changed, which makes it possible to easily cope with the type of article P to be loaded. Meanwhile, the guard member 410 may be provided in plural, and the plurality of guard members 410 may be provided in the alignment unit 400. In this case, the plurality of articles P may be simultaneously aligned by the alignment unit 400, and thus the process of loading the article P may be quickly performed.

Referring to FIGS. 5 and 6, the article loading apparatus 10 may further include a magnetic member 500 provided at one side of the first holding unit 300.

As described above, among the articles P provided in the plate 200, the article P held by the pinching member 320 of the first holding unit 300 may be accommodated in the accommodation space in the guard member 410 of the alignment unit 400. However, the article P may not be accommodated in the accommodation space in the guard member 410 depending on the state of the article P held by the pinching member 320.

The magnetic member 500 may be configured to change a state of the article P, which cannot be accommodated in a predetermined aligned state in the guard member 410 even though the article P is held by the pinching member 320, to a state of the article P that may be accommodated in the guard member 410.

Figure 7A:
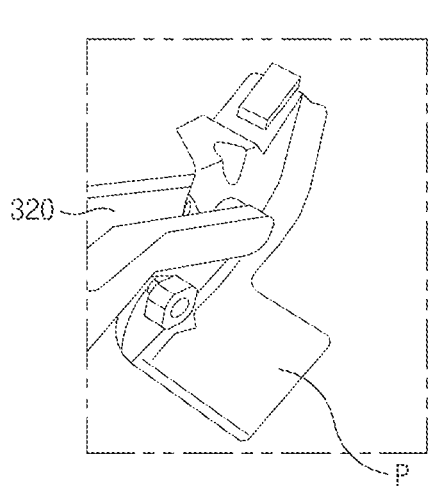
FIGS. 7A, 7B, 7C, and 7D are views sequentially illustrating a state in which a posture of the magnetic member is changed before an article is loaded onto a carrier by the article loading apparatus according to the present disclosure.
Figure 7B:
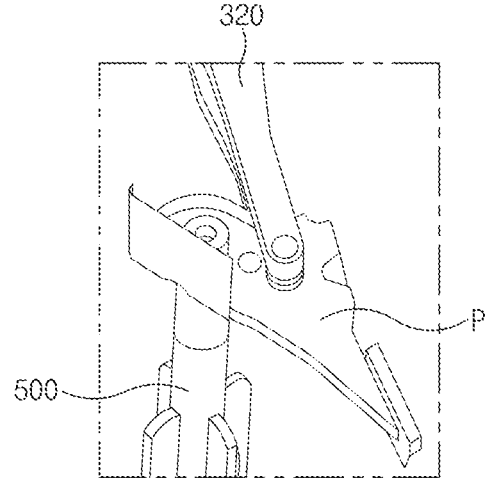
Figure 7C:
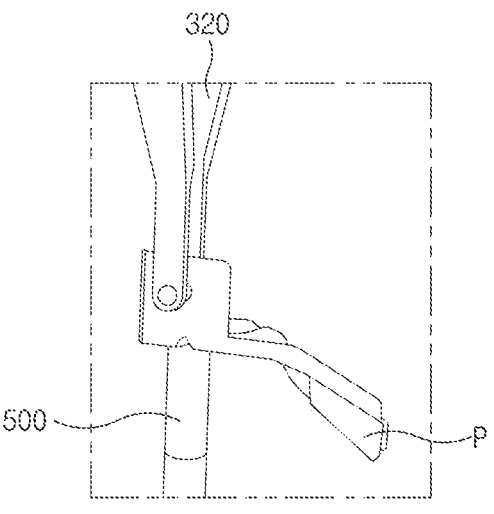
Figure 7D:
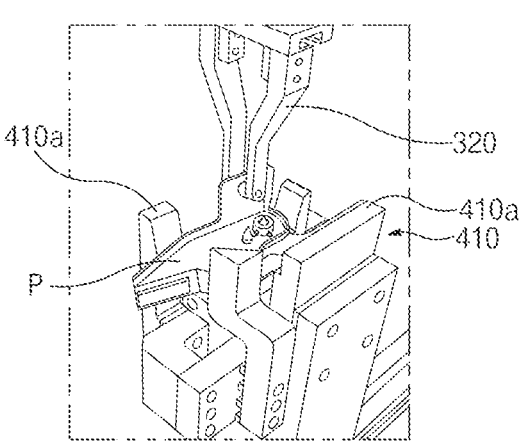

That is, as illustrated in FIG. 7A, when the article P is held by the pinching member 320 to the extent that the article P cannot be accommodated in a predetermined aligned state in the guard member 410, the article P is attached to the magnetic member 500 as illustrated in FIG. 7B, and then the pinching member 320 holds the article P again, as illustrated in FIG. 7C, while holding a portion of the article P different from the portion of the article P in the plate 200 held by the pinching member 320. Thereafter, as illustrated in FIG. 7D, the article P may be accommodated in the accommodation space of the guard member 410. To perform the above-mentioned function, the magnetic member 500 may be provided within a distance in which the pinching member 320 may reach the magnetic member 500 during the process of operating the first holding unit 300. For example, as illustrated in FIG. 5, the magnetic member 500 may be provided independently of the support unit 700. However, as another example, as illustrated in FIG. 6, the magnetic member 500 may be fixedly coupled to one side of the alignment unit 400.

Meanwhile, as illustrated in FIG. 1, the article loading apparatus 10 may further include a second holding unit 600 provided at one side of the alignment unit 400 and configured to hold the article P accommodated in the guard member 410 and load the article P to one side (e.g., onto the carrier 20). The second holding unit 600 may include a clamp member for holding the article P. Alternatively, the second holding unit 600 may include a pinching member for holding the article P. Meanwhile, according to another example of the present disclosure, the article loading apparatus 10 may not include the second holding unit 600. In this case, the article P aligned by the alignment unit 400 may be held by the first holding unit 300 and then loaded.

Meanwhile, as illustrated in FIG. 1, the article loading apparatus 10 may further include an image capturing member 800 configured to capture an image of a distributed state of the articles P accommodated in the storage member 100 and the plate 200. More specifically, the image capturing member 800 may capture an image of the distributed state of the articles P accommodated in the storage member 100 or in the plate 200. The electromagnet member 310 and the pinching member 320 may respectively pick up the article P in the storage member 100 and the article P in the plate 200 based on the distributed state.

Hereinafter, an article loading method according to the present disclosure will be described with reference to the above-mentioned contents.

The article loading method according to the present disclosure may include a first transfer step of picking up at least some of the plurality of articles P accommodated in the storage member 100 and transferring the articles P to an upper portion of the plate 200, and a dropping step of dropping the plurality of articles P, which is transferred to the upper portion of the plate 200 in the first transfer step, onto the plate 200. The first transfer step may be performed by the electromagnet member 310 of the first holding unit 300. More specifically, in the first transfer step, at least some of the plurality of articles P accommodated in the storage member 100 may be picked up by the magnetic force of the electromagnet member 310 and then transferred to the upper portion of the plate 200. In contrast, in the dropping step, the magnetic force of the electromagnet member 310 may be eliminated, such that the article P attached to the electromagnet member 310 is freely dropped toward the plate 200. In this case, after the dropping step, the plurality of articles P may be provided in the plate 200 and spaced apart from one another without interfering with one another. Therefore, a distance between the electromagnet member 310 and the plate 200 during the dropping step may correspond to an interval by which the plurality of articles P is sufficiently spaced apart from one another without interfering with one another by being freely dropped. Meanwhile, the plurality of articles P may be transferred to the upper portion of the plate 200 in the first transfer step so that the plurality of articles P is provided in the plate 200 in the dropping step.

In addition, the article loading method may further include a second transfer step of picking up some of the articles, which is dropped onto the plate 200 in the dropping step, and transferring the articles to the alignment unit 400. In the second transfer step, the pinching member 320 may hold some of the articles P accommodated in the plate 200 and transfer the articles P to the alignment unit 400. In particular, as described above, the plurality of articles P may be provided in the plate 200 and spaced apart from one another without interfering with one another after the dropping step. Therefore, during the process in which the pinching member 320 holds one of the plurality of articles P in the plate 200, it is possible to prevent the pinching member 320 from interfering with another article. Meanwhile, referring to the contents described above in respect to the article loading apparatus according to the present disclosure, the article P may be disposed in the accommodation space defined by the inner surface of the guard member 410 of the alignment unit 400 in the second transfer step.

In particular, according to the present disclosure, the plurality of articles P may be transferred to the upper portion of the plate 200 by the electromagnet member 310 in the first transfer step, whereas the articles P may be transferred, one by one, to the alignment unit 400 from the plate 200 in the second transfer step. This may be because the first transfer step and the dropping step are provided to implement a state in which the plurality of articles is provided in the plate 200 and spaced apart from one another without interfering with one another, whereas the second transfer step is provided to implement a state in which the article to be loaded in a loading step is aligned in a predetermined aligned state by the alignment unit 400.

The article loading method according to the present disclosure may further include the loading step of transferring the article P, which is transferred to the alignment unit 400 in the second transfer step, to one side. For example, one side may be the carrier 20. In the second transfer step, the second holding unit 600 of the article loading apparatus 10 according to the present disclosure may transfer the article P and load the article P to one side. However, unlike the above-mentioned configuration, the first holding unit 300 of the article loading apparatus 10 according to the present disclosure may transfer the article P and load the article P to one side in the second transfer step. In this case, the first holding unit 300 may perform not only the first and second transfer steps but also the loading step without the second holding unit 600.

Meanwhile, the article loading method according to the present disclosure may further include a storage member vision capturing step of, before the first transfer step, capturing images of position states of the plurality of articles P in the storage member 100. In this case, according to the present disclosure, the first transfer step may be performed when it is determined in the storage member vision capturing step that the article P exists in the storage member 100. In contrast, when it is determined in the storage member vision capturing step that the article P does not exist in the storage member 100 any further, an empty storage member may be replaced with a storage member having the plurality of articles P.

In addition, the article loading method according to the present disclosure may further include a plate vision capturing step of, before the second transfer step, capturing an image of a position state of the article P in the plate 200. The plate vision capturing step may be provided to check a posture of the article P provided in the plate 200 and check whether the article P exists in a posture that may be held by the pinching member 320 in the second transfer step. Therefore, according to the present disclosure, the second transfer step may be performed when it is determined in the plate vision capturing step that at least some of the articles disposed in the plate 200 may be held by the pinching member 320.

More specifically, the aligned state of the article P in the plate 200 may include a first state which is an arrangement state in which the pinching member 320 may hold the article P in the plate 200 and then immediately transfer the article P to the alignment unit 400 in the second transfer step, and a second state which is an arrangement state in which the pinching member 320 needs to hold the article P in the plate 200, attach the article P to the magnetic member 500, separate from the article P, hold the article P again, and then transfer the article P to the alignment unit 400 in the second transfer step.

In this case, according to the present disclosure, when at least some of the articles P disposed in the plate 200 and captured in the plate vision capturing step are disposed in the first state, the pinching member 320 may hold the article P disposed in the first state in the plate 200 and then transfer the article P to the alignment unit 400 in the second transfer step. In this case, the article P held by the pinching member 320 in the second transfer step may be kept continuously held by the pinching member 320 until the article P reaches the alignment unit 400. It can be understood that the article P, which is disposed in the first state in the plate 200 and then held by the pinching member 320, is immediately transferred to the alignment unit 400 without the magnetic member 500.

In contrast, according to the present disclosure, when at least some of the articles P disposed in the plate 200 and captured in the plate vision capturing step are disposed in the second state different from the first state, in the second transfer step, the pinching member 320 may hold the article P disposed in the second state in the plate 200, the pinching member 320 may attach the article P to the magnetic member 500 having magnetism and separate from the article P, the pinching member 320 may hold again the article P attached to the magnetic member 500, and then the pinching member 320 may transfer the article P to the alignment unit 400. More specifically, in the second transfer step, a portion of the article P which is disposed in the second state in the plate 200 and with which the pinching member 320 comes into contact to hold the article P may be different from a portion of the article P which is attached to the magnetic member 500 and brought into contact with the pinching member 320. Therefore, during the process of holding the article P attached to the magnetic member 500, the pinching member 320 may change the posture of the article P so that the article P may be accommodated in the guard member 410 of the alignment unit 400.

Meanwhile, for example, according to the present disclosure, in the second transfer step, the pinching member 320 may hold the article P disposed in the second state in the plate 200 when there exists no article P disposed in the first state in the plate 200. That is, according to the present disclosure, in the second transfer step, all the articles P in the first state are transferred to the alignment unit 400, and then the article P in the second state may be transferred to the alignment unit 400.

In addition, the article loading method according to the present disclosure may further include a returning step of returning the article P in the plate 200 to the storage member 100 when it is determined that the article, which may be held by the pinching member 320, does not exist in the plate 200 captured in the plate vision capturing step. For example, the returning step may be performed when the article P, which is in the first or second state among the articles P in the plate 200, does not exist any further. However, in addition to the first and second states, a third state may be additionally set, and the third state may be a state in which the article P in the plate 200 may be transferred to the alignment unit 400. The returning step may be performed when the article P in the third state, in addition to the first and second states, does not exist any further.

More specifically, in the returning step, the plate 200 spaced apart upward from the storage member 100 may be inclined toward the storage member 100, such that the article in the plate 200 may be dropped onto the storage member 100.

Meanwhile, the article loading method according to the present disclosure may include an information receiving step of receiving information on the component (e.g., the carrier 20) to which the article P transferred to the alignment unit 400 needs to be loaded, and an article unloading step of unloading the article P from the alignment unit 400. The article unloading step may be performed by the second holding unit 600. However, the article unloading step may also be performed by the first holding unit 300. As described above, the second holding unit 600 may be eliminated when the article unloading step is performed by the first holding unit 300.

In addition, the article loading method may further include a dispersion checking step of checking a distributed state of the regions to which the articles P are loaded in the component (e.g., the carrier 20) to which the articles P are loaded. For example, the dispersion checking step may be performed after the article unloading step, and the loading step may be performed after the dispersion checking step.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

The invention claimed is:

1. An article loading apparatus comprising:
   a storage member configured to accommodate a plurality of articles;
   a plate positioned at one side of the storage member; and
   a first holding unit positioned at the one side of the storage member and one side of the plate, the first holding unit being configured to pick up the plurality of articles positioned in the storage member, and move the plurality of articles to the plate;
   wherein the first holding unit comprises:
   an electromagnet member configured to perform a first transfer step of lifting and transferring the plurality of articles accommodated in the storage member and transfer the plurality of articles; and
   a pinching member configured to perform a second transfer step of holding and transferring the plurality of articles located on the plate;
   wherein the first holding unit is configured to capture an image of the positional state of the plurality of articles in the storage member and to perform the first transfer step when it is determined that the articles exist in the storage member;
   wherein, in the first transfer step, the articles transferred to an upper side of the plate are dropped onto the plate;
   wherein the first holding unit is further configured to capture an image of the positional state of the articles on the plate and to perform the second transfer step when it is determined that at least some of the articles on the plate are capable of being held; and
   wherein, in the second transfer step, when no article on the plate is arranged in a first state in which the article can be directly transferred to an alignment unit after being held by the pinching member, the pinching member grips an article that is arranged on the plate in a second state in which the article must be attached to the electromagnet member after being held, separated therefrom, and re-gripped before being transferred to the alignment unit.

2. The article loading apparatus of claim 1, wherein the plate is positioned above the storage member and adjacent to one side based on a horizontal direction from the storage member.

3. The article loading apparatus of claim 1, further comprising:

an alignment unit provided at one side of the first holding unit and configured to receive the plurality of articles held by the pinching member;

wherein the alignment unit comprises a guard member having an accommodation space configured to accommodate the article;

wherein the guard member comprises a plurality of blocks configured to define the accommodation space and surround a lateral surface of the article; and wherein some of the plurality of blocks are movable relative to other of the plurality of blocks.

4. The article loading apparatus of claim 3, wherein the guard member comprises a plurality of guard members positioned in the alignment unit.

5. The article loading apparatus of claim 3, further comprising:

a magnetic member positioned at one side of the first holding unit, wherein the magnetic member is provided within a distance in which the pinching member is capable of reaching the magnetic member.

6. The article loading apparatus of claim 3, further comprising:

a second holder positioned at one side of the alignment unit and configured to hold one of the plurality of articles accommodated in the plurality of guard members and load the one of the plurality of articles to one side.

7. The article loading apparatus of claim 1, further comprising:

a support unit to which the storage member and the plate are coupled;

wherein the plate is rotatably coupled to the support unit to be inclined toward the storage member; and wherein the support unit comprises:

a plurality of stopper members positioned to face two opposite surfaces of the storage member; and a guard member positioned to face one side surface of the storage member and configured to be rotatable about a rotary shaft extending in a vertical direction.

8. An article loading method comprising:

a first transfer step of picking up at least some of a plurality of articles positioned in a storage member and transferring the at least some of the plurality of articles to an upper portion of a plate;

a dropping step of dropping the at least some of the plurality of articles, which are transferred to the upper portion of the plate in the first transfer step, onto the plate;

a second transfer step of picking up at least some of the plurality of articles, which are dropped onto the plate in the dropping step, and transferring the at least some of the plurality of articles to an alignment unit; and a loading step of transferring at least some of the plurality of articles, which are transferred to the alignment unit in the second transfer step, and loading the at least some of the articles to one side;

wherein the at least some of the articles are freely dropped toward the plate in the dropping step;

wherein the first transfer step comprises a step of picking up at least some of the plurality of articles accommodated in the storage member by using a magnetic force of an electromagnet member and transferring at least some of the plurality of articles to the upper portion of the plate;

wherein the second transfer step comprises a step of holding, by a pinching member, at least some of the plurality of articles accommodated in the plate and transferring at least some of the plurality of articles to the alignment unit;

a plate vision capturing step of, before the second transfer step, capturing an image of a position state of the plurality of articles in the plate;

wherein the second transfer step is performed when it is determined, in the plate vision capturing step, that at least some of the plurality of articles in the plate are capable of being held;

wherein when at least some of the plurality of articles in the plate and captured in the plate vision capturing step are in a second state different from the first state, in the second transfer step, the pinching member holds the plurality of articles in the second state in the plate, the pinching member attaches the plurality of articles to a magnetic member having magnetism and separates from the plurality of articles, the pinching member holds again the plurality of articles attached to the magnetic member, and the pinching member transfers the plurality of articles to the alignment unit; and wherein in the second transfer step, the pinching member holds the plurality of articles in the second state in the plate when there exists no article disposed in the first state in the plate.

9. The article loading method of claim 8, wherein the plurality of articles are transferred to the upper portion of the plate in the first transfer step, and the plurality of articles are transferred one by one from the plate to the alignment unit in the second transfer step.

10. The article loading method of claim 8, further comprising:

a storage member vision capturing step of, before the first transfer step, capturing images of position states of the plurality of articles in the storage member;

wherein the first transfer step is performed when it is determined, in the storage member vision capturing step, that the plurality of articles exists in the storage member.

11. The article loading method of claim 8, wherein in the second transfer step, a portion of the plurality of articles in the second state in the plate and with which the pinching member comes into contact to hold the plurality of articles is different from a portion of the plurality of articles which is attached to the magnetic member and brought into contact with the pinching member.

12. The article loading method of claim 8, further comprising:

a returning step of returning the plurality of articles in the plate to the storage member when it is determined that the plurality of articles, which are capable of being held by the pinching member, do not exist in the plate captured in the plate vision capturing step.

13. The article loading method of claim 12, wherein in the returning step, the plate spaced apart upward from the storage member is inclined toward the storage member, such that the plurality of articles in the plate are dropped onto the storage member.

* * * * *